(12) United States Patent
Stier

(10) Patent No.: US 6,808,133 B1
(45) Date of Patent: Oct. 26, 2004

(54) FUEL INJECTION VALVE

(75) Inventor: Hubert Stier, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 362 days.

(21) Appl. No.: 09/856,906

(22) PCT Filed: Sep. 28, 2000

(86) PCT No.: PCT/DE00/03422

§ 371 (c)(1),
(2), (4) Date: Oct. 25, 2001

(87) PCT Pub. No.: WO01/25612

PCT Pub. Date: Apr. 12, 2001

(30) Foreign Application Priority Data

Sep. 29, 1999 (DE) ......................................... 199 46 602

(51) Int. Cl.[7] ............................................. F02M 51/00
(52) U.S. Cl. ................. 239/585.1; 239/585.4; 239/585.5; 251/129.15
(58) Field of Search ........................... 239/585.1, 585.4, 239/585.5, 900, 600; 251/129.15, 129.21; 29/890.142, 890.143

(56) References Cited

U.S. PATENT DOCUMENTS

| | | | |
|---|---|---|---|
| 4,592,533 A | * | 6/1986 | Guglielmi et al. ....... 251/30.01 |
| 4,844,339 A | | 7/1989 | Sayer et al. |
| 4,978,074 A | * | 12/1990 | Weinand .................. 239/585.3 |
| 4,984,549 A | * | 1/1991 | Mesenich .................... 123/472 |
| 5,088,467 A | | 2/1992 | Mesenich |
| 5,299,776 A | | 4/1994 | Brinn, Jr. et al. |
| 5,301,874 A | * | 4/1994 | Vogt et al. ................ 239/585.4 |
| RE34,945 E | * | 5/1995 | Sayer et al. .................... 239/5 |
| 5,996,910 A | * | 12/1999 | Takeda et al. ........... 239/585.1 |

FOREIGN PATENT DOCUMENTS

| | | |
|---|---|---|
| DE | 33 14 899 | 10/1984 |
| DE | 198 08 067 | 9/1989 |
| DE | 197 36 548 | 2/1999 |
| DE | 197 56 103 | 6/1999 |
| EP | 0 404 336 | 12/1990 |
| WO | WO 93 00 540 | 1/1993 |

* cited by examiner

Primary Examiner—Michael Mar
Assistant Examiner—Thach H. Bui
(74) Attorney, Agent, or Firm—Kenyon & Kenyon

(57) ABSTRACT

A fuel injector for directly injecting fuel into the combustion chamber of an internal combustion engine includes a solenoid coil, an armature that can be acted upon by the solenoid coil in a stroke direction in opposition to a first resetting spring, and a valve needle connected to a valve-closure member. The valve needle has a first limit stop for the movable armature, the armature additionally being acted upon by a second resetting spring. A stationary second limit stop is provided for the armature. The second resetting spring acts upon the armature contrary to the stroke direction and, in the resting position, when the solenoid coil is not excited, the second resetting spring holds the armature in position at the second limit stop such that the armature is at a preestablished distance from the first limit stop configured on the valve needle.

16 Claims, 5 Drawing Sheets

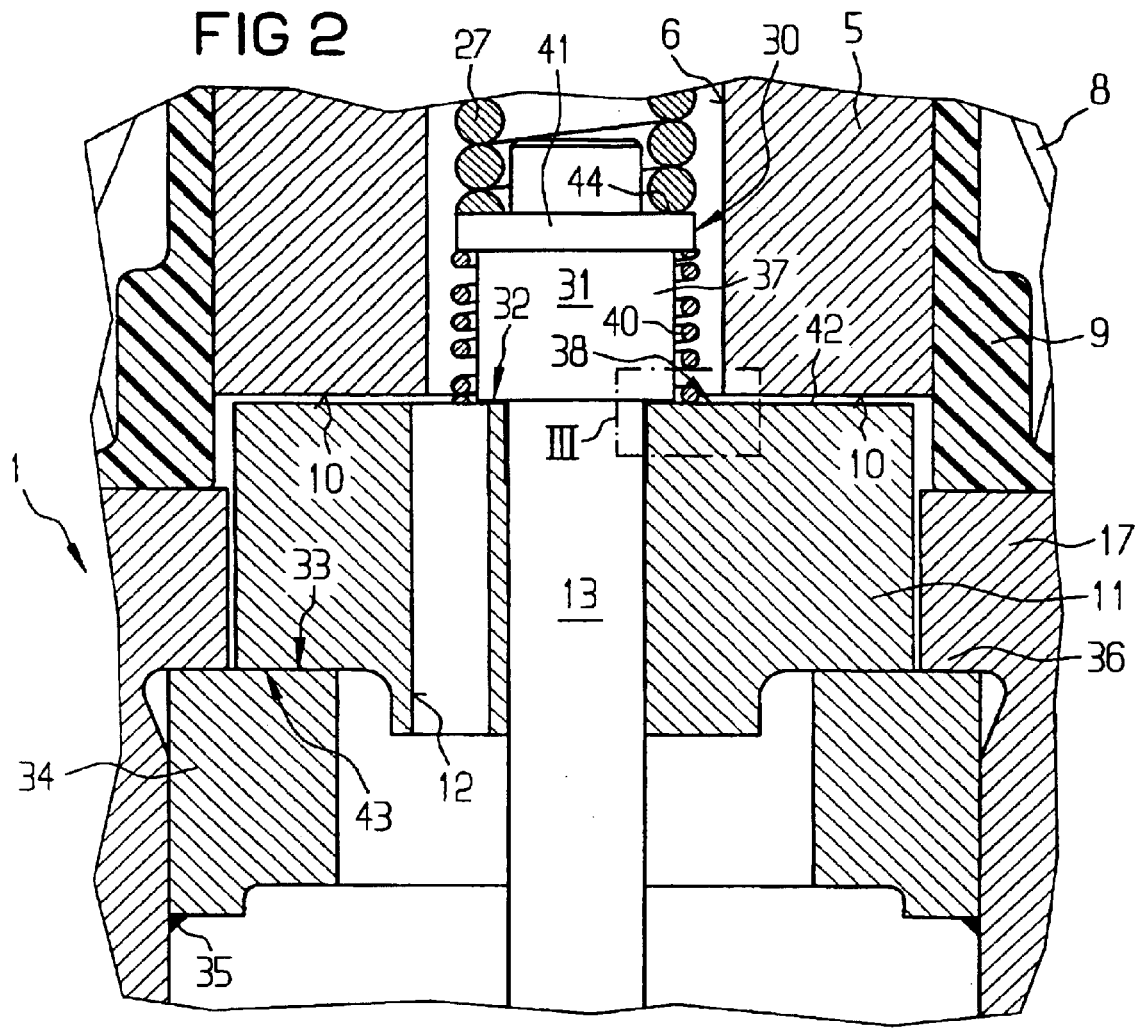
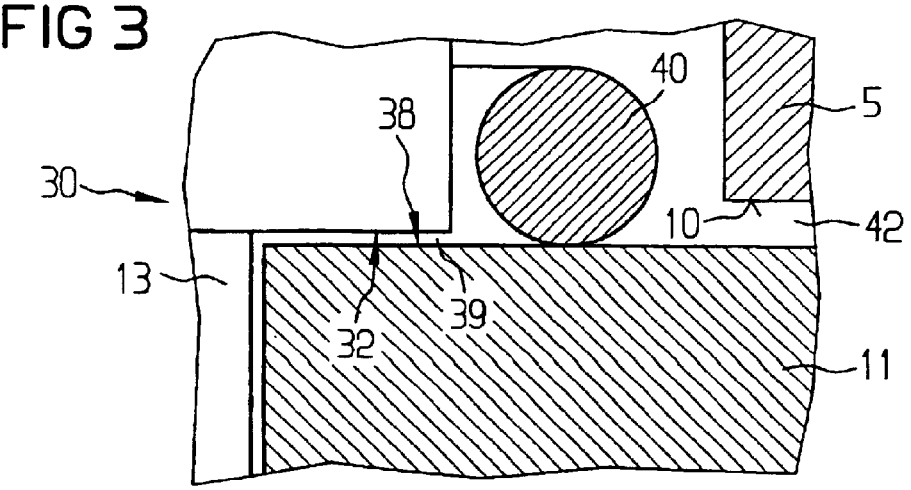

FUEL INJECTION VALVE

FIELD OF THE INVENTION

The present invention relates to a fuel injector.

BACKGROUND INFORMATION

German Published Patent Application No. 33 14 899 describes an electromagnetically actuatable fuel injector, in which an armature cooperates with an electrically excitable solenoid coil for the purpose of electromagnetic actuation, and the stroke of the armature is transmitted via a valve needle to a valve-closure member. The valve-closure member cooperates with a valve seat. The armature is not fixedly mounted on the valve needle but rather the armature is arranged so as to be axially movable with respect to the valve needle. A first resetting spring acts upon the valve needle in the closing direction and therefore keeps the fuel injector closed in the currentless, non-excited state of the solenoid coil. The armature, via a second resetting spring, is acted upon in the stroke direction such that the armature, in the resting position, contacts a first limit stop that is provided on the valve needle. When the solenoid coil is excited, the armature is pulled in the stroke direction and, as a result of the first limit stop, takes the valve needle with it. When the current exciting the solenoid coil is switched off, the valve needle is accelerated into its closed position by the first resetting spring, taking the armature with it as a result of the above-mentioned limit stop. As soon as the valve-closure member strikes against the valve seat, the closing motion of the valve needle is abruptly ended. The armature, which is not fixedly joined to the valve needle, continues to move in the stroke direction and the motion is absorbed by the second resetting spring, i.e., the armature swings through against a second resetting spring, which has a significantly lower spring constant than the first resetting spring. Finally, the second resetting spring accelerates the armature once again in the stroke direction. If the armature strikes against the limit stop of the valve needle, the can result in the valve-closure member, which is connected to the valve needle, once again briefly lifting off from the valve seat, therefore generating a short-term opening of the fuel injector. The debouncing in the fuel injector known from German Published Patent Application No. 33 14 899 is therefore imperfect. In addition, it is disadvantageous both in a conventional fuel injector, in which the armature is fixedly connected to the valve needle, as well as in the fuel injector known from German Published Patent Application No. 33 14 899, that the opening stroke of the valve needle begins immediately as soon as the magnetic force exerted by the solenoid coil on the armature exceeds the sum of the forces acting in the closing direction, i.e., the spring closing force exerted by the first resetting spring and the hydraulic forces of the fuel, which is under pressure. This is disadvantageous to the extent that, when the current exciting the solenoid coil is switched on, the magnetic force has not yet reached its final value due to the self-induction of the solenoid coil and the eddy currents that arise. At the beginning of the opening stroke, the valve needle and the valve-closure member are therefore accelerated at a reduced force. This leads to an opening time that is not satisfactory for all application cases.

In U.S. Pat. No. 5,299,776, it is proposed, in this regard, not to connect the armature fixedly to the valve needle but rather to allow the armature a certain axial freedom of motion on the valve needle. However, in this embodiment, the axial position of the armature, in the resting position of the fuel injector, is not defined, and therefore, in the fuel injector known from this publication, the response time is uncertain when the exciting current is switched on.

SUMMARY OF THE INVENTION

In contrast, the fuel injector according to the present invention has the advantage that the fuel injector is debounced in a satisfactory manner and, additionally, that it has an extremely small opening time. Because of the immediate limit stop on the connecting part, an adjusting or guide disk can be dispensed with. The enlarged guide diameter generates improved guide properties, i.e., the valve needle is less sensitive to tilting or jamming. As a result of the fact that the guide is closer on the armature, the moments are reduced.

As a result of the fact that the second resetting spring holds the armature in the resting position of the fuel injector not at the first limit stop provided on the valve needle but at a stationary second limit stop at a distance from the first limit stop of the valve needle, it is achieved, when the fuel injector is closed, that the armature is not accelerated once again in the stroke direction by the second resetting spring. When the fuel injector is closed, the motion of the valve needle is abruptly ended if the valve-closure member comes into contact with the valve seat, as a result of the acceleration by the first resetting spring. In the fuel injector according to the present invention, the motion of the armature also continues in the closing direction, i.e., contrary to the stroke direction, until the armature has reached the second limit stop. If the armature rebounds from the second limit stop, it is nevertheless once again accelerated by the second resetting spring, contrary to the stroke direction, and the armature is prevented once again from reaching the first limit stop on the valve needle and therefore from carrying the valve needle with it in the opening direction. As a result of the second resetting spring, the armature is held at a distance from the first limit stop provided on the valve needle until the armature is once again accelerated in the stroke direction by the solenoid coil as a consequence of the next current pulse exciting the solenoid coil.

A further advantage of the fuel injector lies in the fact that the armature initially experiences a preacceleration before reaching the first limit stop provided on the valve needle, i.e., before carrying the valve needle with it. In this manner, the armature received an impulse, which it transmits to the valve needle, even before carrying the valve needle with it. In comparison to a fuel injector in which the armature is fixedly connected to the valve needle or a fuel injector in which the armature is movable with respect to the valve needle but in the resting position contacts the limit stop of the valve needle, a substantially shorter opening time and therefore a more precise metering of the fuel is achieved. A further effect that shortens the opening time arises from the fact that the magnetic force exerted on the armature is initially reduced when the current pulse exciting the solenoid coil is switched on, due to the self-induction of the solenoid coil and the eddy currents excited by the solenoid coil. If the distance is appropriately dimensioned between the second limit stop, at which the armature is positioned in its resting position, and the first limit stop, which acts to carry the valve needle with it, it can therefore be achieved that, when the armature strikes the first limit stop of the valve needle, so much time has already passed that the magnetic force has reached its final constant value. Therefore, as a result of the added flight time of the armature, a time delay is achieved which significantly shortens the subsequent opening time of the fuel injector.

In the connecting part executed as the valve seat support, it is possible to integrate both an armature guide as well as a second limit stop. In this context, however, in a first peripheral area, the valve seat support having the armature guide can be configured not having the second limit stop, and in a second peripheral area, it can be configured as having the second limit stop but not having the anchor guide. As a result of the functional separation of limit stop and anchor guide, the requirements with respect to manufacturing precision are less stringent.

To prevent a magnetic short-circuit, the magnetic restricter is preferably arranged in the area between the second limit stop and a valve needle shaft of the valve needle. The magnetic restricter can be arranged either on the valve seat support or on the armature. In the arrangement on the armature, the magnetic restricter is preferably located on the periphery of a segment aligned with the valve needle.

BRIEF DESCRIPTION OF THE DRAWINGS

FIG. 2 depicts a section of a cutaway representation of a fuel injector based on the fundamental kinematic principle underlying the present invention, but not having all of the features of the present invention.

FIG. 3 depicts an enlarged representation of section III in FIG. 2.

DETAILED DESCRIPTION

Figure 1:
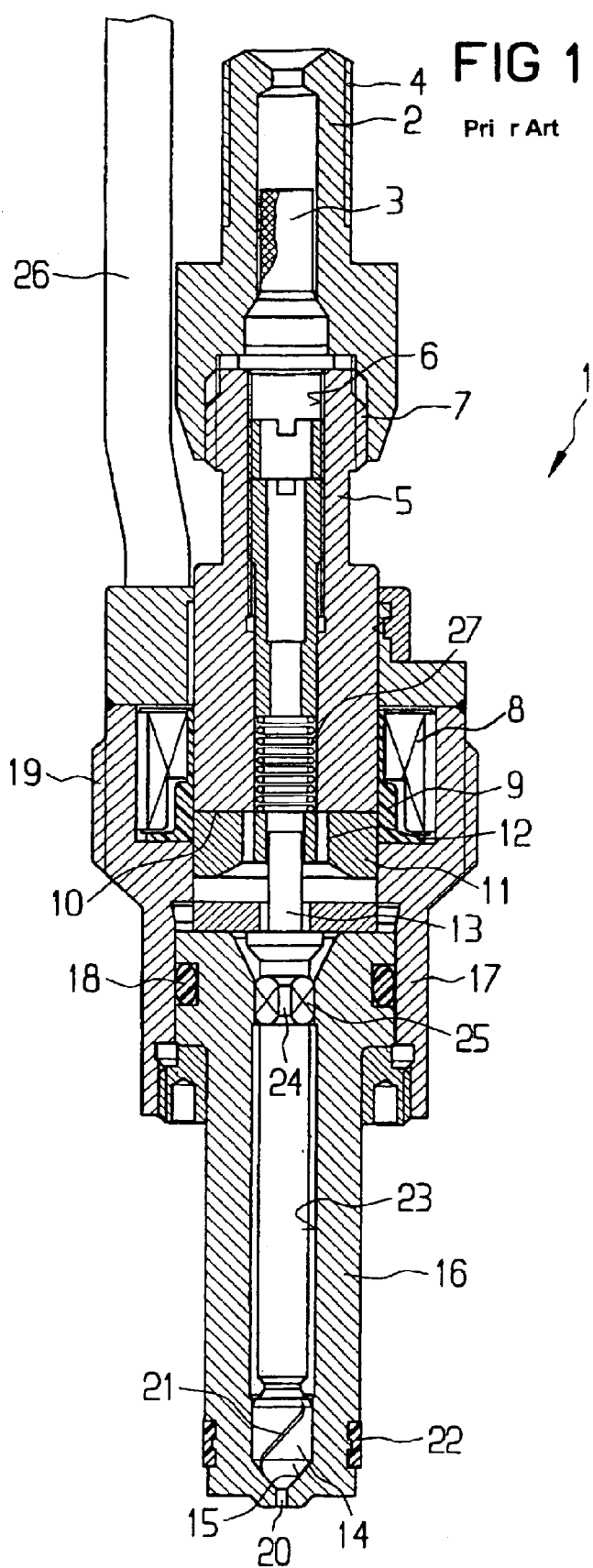
FIG. 1 depicts a fuel injector according to the related art in a cutaway representation.

Before three exemplary embodiments of a fuel injector equipped in accordance with the present invention are described in greater detail on the basis of FIGS. 4, 5, 6, and 7, an already known fuel injector will first be briefly explained on the basis of FIG. 1 with respect to its essential components, for the purpose of improved comprehension, and then, on the basis of FIGS. 2 and 3, the fundamental kinematic base principle underlying the present invention will be briefly explained.

The fuel injector generally designated as reference numeral 1 has a fuel intake pipe 2, which can be connected via a thread 4 to a fuel line in a generally known manner. Fuel injector 1 is executed in the shape of an injector for fuel injection systems of mixture-compressing, spark-ignition internal combustion engines. Fuel injector 1 is particularly suited for the direct injection of fuel into an undepicted combustion chamber of an internal combustion engine. Via a fuel filter 3, the fuel enters a longitudinal bore hole 6 configured in a core 5. Core 5 has an external thread segment 7, which is screwed to fuel intake pipe 2.

Core 5 at its downstream end 10 is surrounded by solenoid coil 8, which is wound on a coil holder 9. Located downstream of downstream end 10 of core 5 is an armature 11, which is separated from end 10 of core 5 by a slight gap. Armature 11 has bore holes 12 for the passage of the fuel. Armature 11 is also fixedly connected to a valve needle 13, e.g., by welding. At the end opposite armature 11, valve needle 13 has a valve-closure member 14, which cooperates with a valve seat 15 configured on a valve seat support 16. In the example depicted in FIG. 1, valve seat support 16 is inserted into a housing body 17 and is sealed by a sealing ring 18.

Housing body 17 can be screwed using a thread 19, e.g., into an undepicted cylinder head of an internal combustion engine. When fuel injector 1 is opened, fuel is injected via at least one spray-discharge opening 20, configured on the downstream end of valve seat support 16, into the also undepicted combustion chamber of the internal combustion engine. Functioning to improve the distribution of the fuel are, e.g., a plurality of peripherally disposed swirl grooves 21 on valve-closure member 14. Functioning to seal off valve seat support 16 in the bore holes of the cylinder head is a gasket seal 22. Valve needle 13 is guided on guide surfaces 24 in a longitudinal bore hole 23 of valve seat support 16. Between guide surfaces 24 there are flattened-off areas 25, to make possible the unimpeded passage of the fuel.

To open fuel injector 1, solenoid coil 8 is excited by an electrical excitation current, which is supplied via an electrical connecting cable 26. In the resting state of fuel injector 1, armature 11 is acted upon by a first resetting spring 27 contrary to its stroke direction, so that valve-closure member 14 on valve seat 15 is held in the sealing position. When solenoid coil 8 is excited, armature 11 is pulled in the stroke direction toward core 5, the stroke being indicated by the gap existing, in the resting position, between core 5 and armature 11. Valve needle 13, fixedly connected to armature 11, and valve-closure member 14 are carried along in the stroke direction so that valve-closure member 14 releases spray-discharge opening 20.

When the excitation current is switched off, armature 11, valve needle 13, which is fixedly connected to armature 11, and valve-closure member 14 are accelerated by first resetting spring 27 in the closing direction contrary to the stroke direction. If valve-closure member 14 strikes against valve seat 15, the result, due to the elasticity of valve needle 13 and due to the mass of armature 11, which is fixedly connected to valve needle 13, can be a rebound of valve-closure member 14 from valve seat 15. This is highly undesirable because this effect can lead to a renewed short-term opening of fuel injector 1, falsifying both the metering time as well as the metering quantity.

When known fuel injector 1, depicted in FIG. 1, is opened, the disadvantage exists that the magnetic force exerted by solenoid coil 8, immediately after the excitation current is switched on, acts on armature 11 and valve needle 13, which is fixedly joined to armature 11. This is unfavorable inasmuch as the magnetic force exerted by solenoid coil 8, immediately after the excitation current is switched on, does not immediately reach its final value due to the self-induction of solenoid coil 8 and due to the eddy currents induced by solenoid coil 8. Therefore, in the initial phase of the opening stroke, a reduced magnetic force is initially exerted on armature 11, which for many application cases leads to an undesirably long opening time.

The embodiment depicted in FIGS. 2 and 3 functions so as to overcome these disadvantages. FIG. 2 depicts a segment in an enlarged, cutaway representation. In this context, in an enlarged view, only those components are shown which are of major importance for the present invention. The configuration of the remaining components can be identical to a known fuel injector 1, in particular a fuel injector 1 depicted in FIG. 1. To facilitate comprehension, the elements in FIG. 2 already described on the basis of FIG. 1 are identified with corresponding reference numerals. In FIG. 3, segment III in FIG. 2 is depicted in a representation that is also significantly enlarged with respect to FIG. 2.

At the end opposite valve-closure member 14, valve needle 13 has a flange 30, which in the depicted example has the shape of a stepped cylinder 37. Armature 11 is not fixedly joined to valve needle 13, but rather is axially movable within preestablished limits with regard to valve needle 13. Valve needle 13, i.e., in the depicted example, flange 30 of valve needle 13, has a first limit stop 32 for armature 11. First limit stop 32 in the depicted example is provided on a first step 31 of flange 30, which is configured as a stepped cylinder 37. A second limit stop 33 is provided on a housing-mounted, stationary adjusting disk 34, which is configured in the example so as to be annular or partially annular, the adjusting disk being able to be inserted into housing body 17. Adjusting disk 34 can be restrained, e.g., by being jammed into place. In addition, it is possible to secure adjusting disk 34 on housing body 17 by a welded seam 35. For axially positioning adjusting disk 34, housing body 17 can have a stepped projection 36. Adjusting disk 34, in this context, when introduced into housing body 17, is inserted until it contacts projection 36 of housing body 17.

In FIGS. 2 and 3, the resting position of fuel injector 1 is depicted, there being no electrical excitation of solenoid coil 8. As can be seen from his Figure, the distance between first limit stop 32 on flange 30 of valve needle 13 and second, stationary limit stop 33 is dimensioned so that, in the resting state of fuel injector 1, a gap 39 arises between first limit stop 32 and end face 38 of armature 11, opposite first limit stop 32. Armature 11 in the depicted resting state is held in position at second limit stop 33 of stationary adjusting disk 34 by a second resetting spring 40. Second resetting spring 40 is positioned between a first step 41 of flange 30, which is configured as a stepped cylinder 37, and end face 38 of armature 11, opposite first limit stop 32. On second step 41 of stepped cylinder 37, first resetting spring 27 is also supported at an end face 44, located opposite, the first resetting spring also contacting valve needle 13 via flange 30 and biasing valve needle 13 in the closing direction. As can be seen both from FIG. 2 as well as from FIG. 3, a second gap 42 exists between downstream end 10 of core 5 and upper end face 38 of armature 11, the second gap being larger dimensioned in the axial direction than first gap 39, which is provided between first limit stop 32 and end face 38 of armature 11.

The mode of functioning of the fuel injector is as follows:

When the fuel injector is opened, after solenoid coil 8 is excited, initially only armature 11 is accelerated in the stroke direction towards second resetting spring 40, at first without carrying with it valve needle 13 and valve-closure member 14, which is connected to valve needle 13. Armature 11, due to the preacceleration, strikes first limit stop 32 so as to have a significant impulse, and carries valve needle 13 and valve-closure member 14 with it. Due to the preacceleration and the impulse of armature 11, a relatively sweeping opening motion is achieved after armature 11 strikes first limit stop 32. In addition, the flight time of armature 11 before striking first limit stop 32 has the advantage that, if the distance between first stop 32 and second limit stop 33 is correctly dimensioned, a delay time is achieved of sufficient length for the magnetic force in the meantime to reach its full intensity. As was already described, in the initial phase of the excitement of solenoid coil 8, the magnetic force generated by solenoid coil 8 is reduced due to the self-induction of solenoid coil 8 and the induced eddy currents. The acceleration of valve needle 13 and of valve-closure member 14 is then achieved at full, not reduced, magnetic force, which also contributes to a short opening time. After reaching first limit stop 32, armature 11, together with valve needle 13 and valve-closure member 14, is accelerated in the stroke direction until end face 38 of armature 11 reaches the downstream end face of end 10 of core 5. First gap 39 therefore determines the preacceleration of armature 11, whereas second gap 42 defines the opening stroke of fuel injector 1.

When fuel injector 1 is closed, armature 11, valve needle 13, and valve-closure member 14 initially move synchronously in the closing direction. As soon as valve-closure member 14 reaches valve seat 15, the motion of valve-closure member 14 and of valve needle 13 is abruptly ended, whereas armature 11 continues to move in the closing direction until armature 11 stikes second limit stop 33. Even if armature 11 rebounds from second limit stop 33, this does not have any negative effect on the opening behavior of fuel injector 1, because second resetting spring 40 prevents armature 11 from once again reaching first limit stop 32. Therefore, valve needle 13 and valve-closure member 14 are prevented from once again being carried along. Finally, armature 11 is held in position at second limit stop 33 by second resetting spring 40, until a new current pulse brings about a new opening of fuel injector 1 by exciting solenoid coil 8.

Therefore, as a result of this measure, both an effective debouncing as well as a relatively short opening time of fuel injector 1 are achieved.

Figure 4:
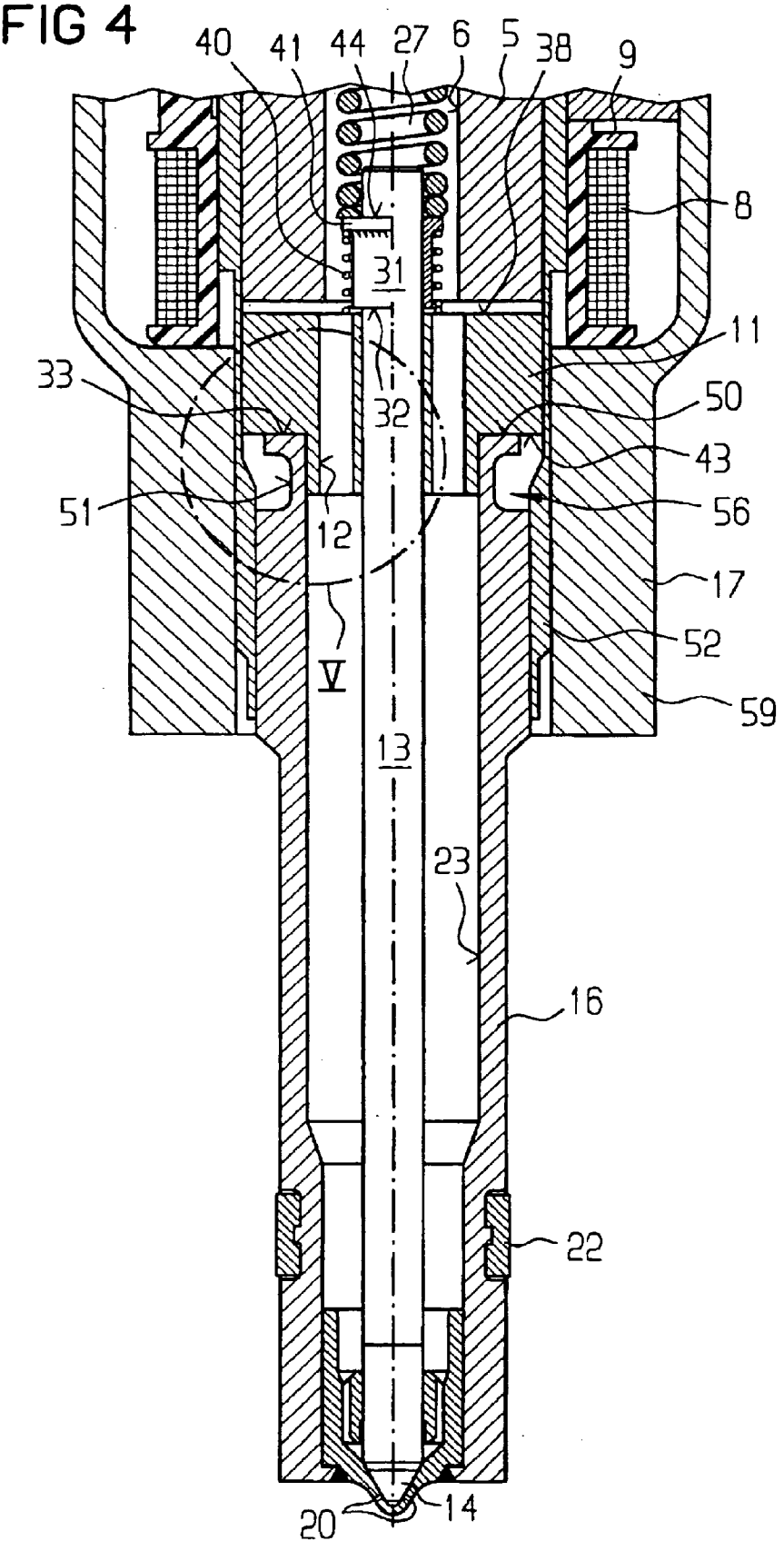
FIG. 4 depicts a section of a cutaway representation of a first exemplary embodiments of a fuel injector according to the present invention.

FIG. 4 depicts a first exemplary embodiment of a fuel injector according to the present invention, in one segment of a cutaway representation. Here too, elements that have already been described are identified with the corresponding reference numerals.

In contrast to the embodiment described on the basis of FIGS. 2 and 3, in the exemplary embodiment according to the present dimension, no adjusting disk 34 is provided. Instead, second limit stop 33 is configured directly on intake-side end face 50 of the connecting part that is configured as valve seat support 16. In the exemplary embodiment depicted in FIG. 4, valve seat support 16 is made of a magnetic, in particular, ferritic material. In this context, what is avoided is that a significant magnetic flux flows from armature 11 into valve seat support 16 and then further directly into housing body 17, which closes the magnetic circuit as external pole 59, because this brings about a counterforce acting on armature 11 in the direction contrary to opening, thus reducing the magnetic opening force that is effectively exerted upon armature 11. Rather, care is taken that the main magnetic flux flows directly from armature 11 into housing body 17, circumventing valve seat support 16. For this purpose, a magnetic restricter 56 is provided on valve seat support 16 directly in the fuel flow direction underneath end face 50 forming second limit stop 33, the restricter being formed by an annular groove 51. As a result of the constriction of the material of valve seat support 16 in the area of restricter 56, the magnetic flux at this location is weakened, so that the main flux overflows directly from armature 11 into housing body 17, i.e., in the reverse direction. A casing 52 is disposed between housing body 17 and armature 11 and valve seat support 16.

Figure 5:
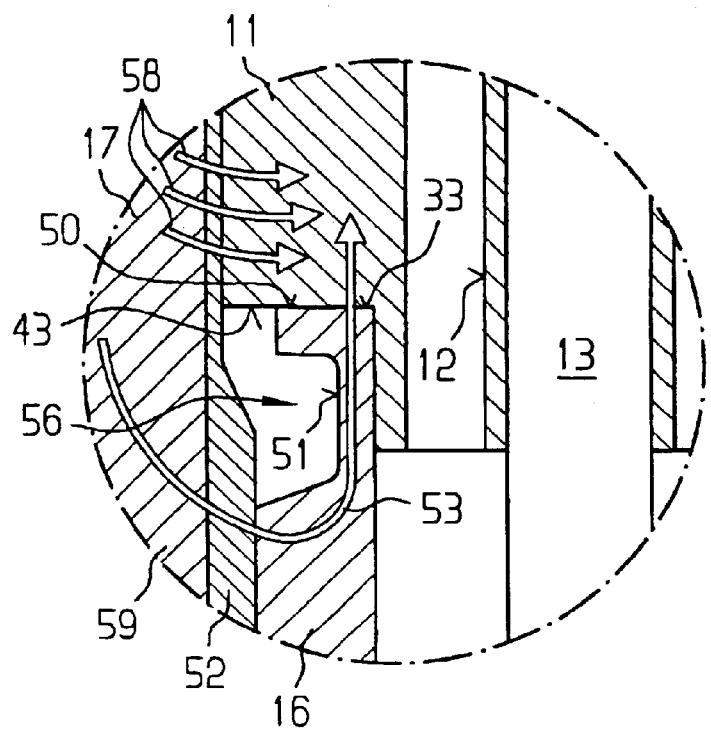
FIG. 5 depicts section V in FIG. 4.

FIG. 5 depicts the segment designated in FIG. 4 as V and clarifies the circumstances described above. It can be seen that secondary magnetic flux 53, which runs from housing body 17, acting as external magnetic pole 59, via valve seat support 16 to armature 11, is significantly weakened in comparison to main magnetic flux 58, which runs from housing body 17 directly to armature 11.

Figure 6:
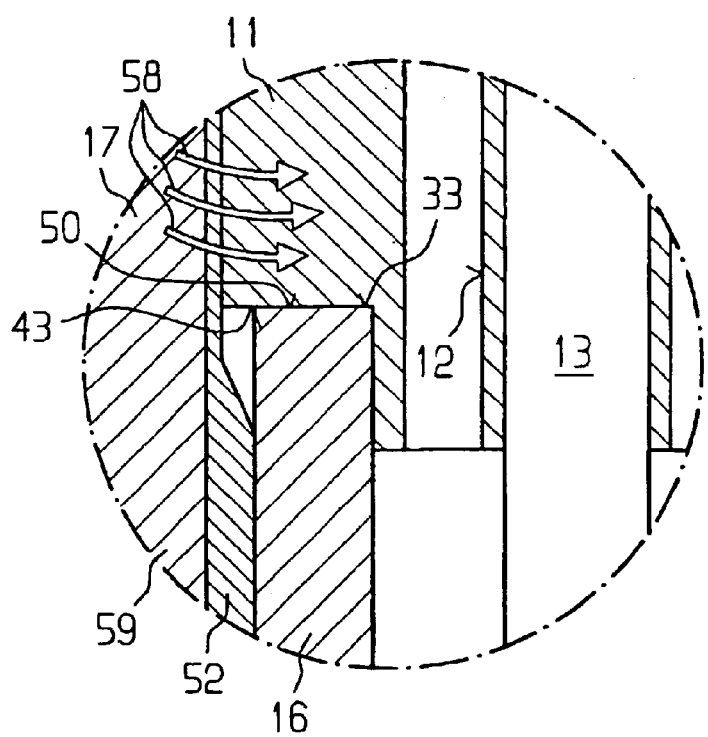
FIG. 6 depicts a section of a cutaway representation of a detail of a second exemplary embodiment of a fuel injector according to the present invention.

FIG. 6 depicts a segment of a cutaway representation of a detail of a second exemplary embodiment of a fuel injector 1 according to the present invention.

The exemplary embodiment depicted in FIG. 6 is distinguished from the exemplary embodiment already described on the basis of FIGS. 4 and 5 by fact that valve seat support 16 is made of a nonmagnetic material, for example, a ceramic material or a plastic material. Because valve seat support 16 in this exemplary embodiment is made of a nonmagnetic material, no secondary magnetic flux is generated via valve seat support 16, so that restricter 56 can be dispensed with.

Figure 7:
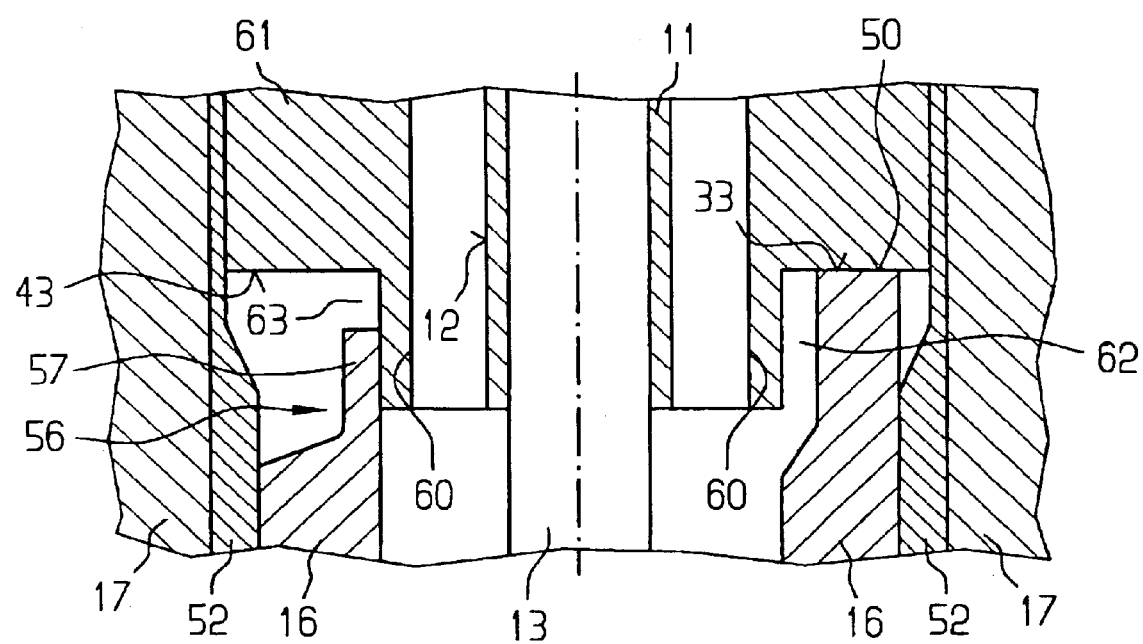
FIG. 7 depicts a section of a cutaway representation of a detail of a third and fourth exemplary embodiment of a fuel injector according to the present invention.

FIG. 7 depicts a detail of a third and fourth exemplary embodiment of a fuel injector 1 according to the present invention, also in a segment view of a cutaway representation. In this context, in the left half of FIG. 7, a third exemplary embodiment is depicted, and in the right half of FIG. 7, a fourth exemplary embodiment. In the third exemplary embodiment, depicted in the left half of FIG. 7, valve seat support 16 takes over only the function of guiding armature 11 but not the function of the armature limit stop. For this purpose, on valve seat support 16, an armature guide 57 is provided, which cooperates with an armature shaft 60, which extends axially in the spray-discharge direction from an armature main body 61. Armature guide 57 is executed on the basis of reduced material strength, so that in this area a magnetic restricter 56 results. Because armature 11 strikes not against valve seat support 16 but rather against another component not depicted in FIG. 7, an axial gap 63 exists between armature guide 57 and end face 43 of armature 11, configured on main armature body 61.

This axial gap 63 creates additional magnetic insulation of armature 11 from valve seat support 16, which in this exemplary embodiment can be made of a magnetic, i.e., ferritic, material.

In the fourth exemplary embodiment of a fuel injector 1 according to the present invention, depicted in the right half of FIG. 7, armature 11 does indeed strike against intake-side end face 50 of valve seat support 16. However, in this exemplary embodiment, valve seat support 16 does not take on the function of guiding armature 11, but rather only of providing the limit stop. Armature 11 can be guided, for example, in the casing 52. A radial gap 62 is formed between valve seat support 16 and armature shaft 60, which extends from main armature body 61. Because in this exemplary embodiment there is no magnetic restricter 56, valve seat support 16 is advantageously made of a nonmagnetic material, for example a ceramic material.

What is claimed is:

1. A fuel injector for a fuel injection system of an internal combustion engine, comprising:
   a solenoid coil;
   a first resetting spring;
   a second resetting spring;
   an armature that can be acted upon by the solenoid coil in a stroke direction in opposition to the first resetting spring, the armature being acted upon by the second resetting spring;
   a valve-closure member;
   a valve needle connected to the valve-closure member and including a first limit stop for the armature;
   a valve seat cooperating with the valve-closure member;
   a connecting part formed of a magnetic material and on which is supported the valve seat;
   a stationary second limit stop configured on the connecting part and provided for the armature;
   and a magnetic restricter disposed in a vicinity of the stationary second limit stop and arranged on at least one of the connecting part and the armature, wherein:
      the second resetting spring acts upon the armature contrary to the stroke direction, and
      in a resting position when the solenoid coil is not excited, the second resetting spring holds the armature in position at the stationary second limit stop such that the armature is positioned at a preestablished distance from the first limit stop, configured on the valve needle.

2. The fuel injector according to claim 1, wherein:
   the fuel injector is for directly injecting a fuel into a combustion chamber of the internal combustion engine.

3. A fuel injector for a fuel injection system of an internal combustion engine, comprising:
   a solenoid coil;
   a first resetting spring;
   a second resetting spring;
   an armature that can be acted upon by the solenoid coil in a stroke direction in opposition to the first resetting spring, the armature being acted upon by the second resetting spring;
   a valve-closure member;
   a valve needle connected to the valve-closure member and including a first limit stop for the armature;
   a valve seat cooperating with the valve-closure member;
   a connecting part formed of a non-magnetic material and on which is supported the valve seat; and
   a stationary second limit stop configured on the connecting part and provided for the armature, wherein:
      the second resetting spring acts upon the armature contrary to the stroke direction, and
      in a resting position when the solenoid coil is not excited, the second resetting spring holds the armature in position at the stationary second limit stop such that the armature is positioned at a preestablished distance from the first limit stop, configured on the valve needle.

4. The fuel injector according to claim 3, wherein:
   the fuel injector is for directly injecting a fuel into a combustion chamber of the internal combustion engine.

5. The fuel injector according to claim 1, further comprising:
   an armature guide integrated in the connecting part, wherein:
   the stationary second limit stop is integrated in the connecting part.

6. The fuel injector according to claim 3, further comprising:
   an armature guide integrated in the connecting part, wherein:
   the stationary second limit stop is integrated in the connecting part.

7. The fuel injector according to claim 5, further comprising:
   an external pole, wherein:
   the armature cooperates with the external pole, the armature guide, and the stationary second limit stop.

8. The fuel injector according to claim 6, further comprising:
an external pole, wherein:
the armature cooperates with the external pole, the armature guide, and the stationary second limit stop.

9. The fuel injector according to claim 1, wherein:
the magnetic restricter is arranged at a periphery of a segment of the armature that is aligned with the valve needle.

10. The fuel injector according to claim 1, further comprising:
an external pole; and
a casing formed of a non-magnetic material and arranged between the connecting part and the external pole.

11. The fuel injector according to claim 3, further comprising:
an external pole; and
a casing formed of a non-magnetic material and arranged between the connecting part and the external pole.

12. A fuel injector comprising:
a solenoid coil;
a first resetting spring;
a second resetting spring;
an armature that can be acted upon by the solenoid coil in a stroke direction in opposition to the first resetting spring, the armature being acted upon by the second resetting spring;
a valve needle including a first limit stop for the armature;
a stationary second limit stop provided for the armature; and
a valve seat cooperating with the valve needle;
wherein:
the second resetting spring acts upon the armature contrary to the stroke direction, and in a resting position when the solenoid coil is not excited, the second resetting spring holds the armature in position at the stationary second limit stop such that the armature is positioned at a preestablished distance from the first limit stop, configured on the valve needle.

13. A fuel injector comprising:
a solenoid coil;
a first resetting spring;
a second resetting spring;
an armature that can be acted upon by the solenoid coil in a stroke direction in opposition to the first resetting spring, the armature being acted upon by the second resetting spring;
a valve needle including a first limit stop for the armature;
a stationary second limit stop provided for the armature; and
a magnetic restricter disposed in a vicinity of the stationary second limit stop and arranged on at least one of the connecting part and the armature;
wherein:
the second resetting spring acts upon the armature contrary to the stroke direction, and in a resting position when the solenoid coil is not excited, the second resetting spring holds the armature in position at the stationary second limit stop such that the armature is positioned at a preestablished distance from the first limit stop, configured on the valve needle.

14. The fuel injector according to claim 12, further comprising:
a connecting part formed of a magnetic material and on which is supported the valve seat.

15. A fuel injector comprising:
a solenoid coil;
a first resetting spring;
a second resetting spring;
an armature that can be acted upon by the solenoid coil in a stroke direction in opposition to the first resetting spring, the armature being acted upon by the second resetting spring;
a valve needle including a first limit stop for the armature;
a stationary second limit stop provided for the armature; and
a connecting part formed of a non-magnetic material and on which is supported the valve seat;
wherein:
the second resetting spring acts upon the armature contrary to the stroke direction, and in a resting position when the solenoid coil is not excited, the second resetting spring holds the armature in position at the stationary second limit stop such that the armature is positioned at a preestablished distance from the first limit stop, configured on the valve needle.

16. A fuel injector comprising:
a solenoid coil;
a first resetting spring;
a second resetting spring;
an armature that can be acted upon by the solenoid coil in a stroke direction in opposition to the first resetting spring, the armature being acted upon by the second resetting spring;
a valve needle including a first limit stop for the armature;
a stationary second limit stop provided for the armature;
wherein:
the second resetting spring acts upon the armature contrary to the stroke direction, and in a resting position when the solenoid coil is not excited, the second resetting spring holds the armature in position at the stationary second limit stop such that the armature is positioned at a preestablished distance from the first limit stop, configured on the valve needle; and
at least a portion of the second resetting spring lies between an end face of the armature facing the first resetting spring and the first limit stop.

* * * * *